United States Patent
Baldwin et al.

(10) Patent No.: US 9,881,316 B2
(45) Date of Patent: *Jan. 30, 2018

(54) PERFORMANCE BASED APPROVAL IN CMS WORKFLOW PROCESS

(71) Applicant: International Business Machines Corporation, Armonk, NY (US)

(72) Inventors: Nicholas A. Baldwin, Gladesville (AU); Laurence A. Hey, Manly (AU); Eric Martinez de Morentin, Manly (AU); Matthew J. Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/608,300

(22) Filed: Jan. 29, 2015

(65) Prior Publication Data

US 2015/0287101 A1    Oct. 8, 2015

Related U.S. Application Data

(63) Continuation of application No. 14/247,692, filed on Apr. 8, 2014.

(51) Int. Cl.
*G06Q 30/02* (2012.01)
*G06Q 10/06* (2012.01)

(52) U.S. Cl.
CPC ... *G06Q 30/0243* (2013.01); *G06Q 10/06316* (2013.01); *G06Q 30/0276* (2013.01)

(58) Field of Classification Search
CPC ......... G06Q 10/06316; G06Q 30/0243; G06Q 30/0276

See application file for complete search history.

(56) References Cited

U.S. PATENT DOCUMENTS

| | | | |
|---|---|---|---|
| 6,259,890 B1 | 7/2001 | Driscoll et al. | |
| 7,058,649 B2 | 6/2006 | Ough et al. | |
| 8,261,362 B2 * | 9/2012 | Goodwin | H04L 63/102 726/27 |
| 8,306,891 B1 | 11/2012 | Findlay, III et al. | |

(Continued)

FOREIGN PATENT DOCUMENTS

| | | |
|---|---|---|
| WO | 2010036467 A2 | 4/2010 |
| WO | 2011060564 A1 | 5/2011 |

OTHER PUBLICATIONS

IBM, "List of IBM Patents or Patent Apllications Treated as Related (Appendix P)," Jan. 29, 2015.

(Continued)

*Primary Examiner* — Jeffrey Zimmerman
(74) *Attorney, Agent, or Firm* — Patricia B. Feighan

(57) ABSTRACT

A method for testing a new workflowed item associated with a workflow process in a content management system (CMS) is provided. The method may include adding a workflow stage to the workflow process in the content management system (CMS). The method may also include adding a test associated with the workflow stage. The method may further include determining if a criteria threshold is met based on the test associated with the workflow stage. Additionally, the method may include publishing the new workflowed item based on the criteria threshold being met.

6 Claims, 3 Drawing Sheets

(56) References Cited

U.S. PATENT DOCUMENTS

| | | | |
|---|---|---|---|
| 9,087,035 B1* | 7/2015 | Bandaru | G06F 17/248 |
| 9,384,198 B2 | 7/2016 | Brown et al. | |
| 2003/0023622 A1 | 1/2003 | Obermeyer et al. | |
| 2003/0144868 A1* | 7/2003 | MacIntyre | G06F 17/30536 |
| | | | 705/7.38 |
| 2008/0228861 A1 | 9/2008 | Tadauchi et al. | |
| 2013/0019028 A1 | 1/2013 | Myers et al. | |
| 2013/0066665 A1* | 3/2013 | Tamhane | G06Q 30/02 |
| | | | 705/7.12 |
| 2013/0268841 A1 | 10/2013 | Kummer | |
| 2013/0290480 A1* | 10/2013 | Manion | H04L 67/02 |
| | | | 709/217 |
| 2014/0032577 A1* | 1/2014 | Trieloff | G06F 17/30 |
| | | | 707/756 |
| 2015/0026699 A1* | 1/2015 | Nakamura | G06F 11/3003 |
| | | | 718/106 |
| 2015/0193711 A1* | 7/2015 | Lavrov | G06F 17/30091 |
| | | | 705/7.23 |

OTHER PUBLICATIONS

Baldwin et al., "Performance Based Approval in CMS Workflow Process," filed Apr. 8, 2014, p. 1-22, U.S. Appl. No. 14/247,692.

Convio, "Creating and Managing Email Messages in an Email Campaign," Convio Online Help, http://help.convio.net/site/PageServer?pagename=Admin_Email_Campaigns_Messages&JServSessionIda004=g23bah5ra1.app33c, Accessed on Feb. 28, 2014, pp. 1-38.

Husain, "Performance Evaluation Process of the Content Management System: Case Study of Kau Marz System," Middle-East Journal of Scientific Research, 2012, pp. 117-127, vol. 11 Issue 1, IDOSI Publications.

Hu et al, "Avoiding Store Misses to Fully Modified Cache Blocks," Performance Computing and Communications Conference, 2006, pp. 289-296, IPCCC 2006, 25th IEEE International.

\* cited by examiner

… … …

PERFORMANCE BASED APPROVAL IN CMS WORKFLOW PROCESS

FIELD OF THE INVENTION

The present invention relates generally to the field of computing, and more particularly to a workflow process.

BACKGROUND

A content management system (CMS) is a computer program that allows publishing, editing and modifying content as well as maintenance from a central interface. Such systems of content management typically provide procedures to manage workflow in a collaborative environment. As such, most content management systems (CMS) may utilize a workflow system to ensure content and changes are reviewed and approved appropriately. However, at the same time, the business may want to improve the performance of its assets, such as focusing on improving click-throughs and ultimately conversions leading to sales. As a result, marketers may run randomized experiments with two variants (i.e., A/B tests) and multi-variate tests to try to test and identify changes that may improve performance of an item.

SUMMARY

According to one embodiment, a method for testing a new workflowed item associated with a workflow process in a content management system (CMS) is provided. The method may include adding a workflow stage to the workflow process in the content management system (CMS). The method may also include adding a test associated with the workflow stage. The method may further include determining if a criteria threshold is met based on the test associated with the workflow stage. Additionally, the method may include publishing the new workflowed item based on the criteria threshold being met.

According to another embodiment, a computer system for testing a new workflowed item associated with a workflow process in a content management system (CMS). The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include adding a workflow stage to the workflow process in the content management system (CMS). The method may also include adding a test associated with the workflow stage. The method may further include determining if a criteria threshold is met based on the test associated with the workflow stage. Additionally, the method may include publishing the new workflowed item based on the criteria threshold being met.

According to yet another embodiment, a computer program product for testing a new workflowed item associated with a workflow process in a content management system (CMS) is provided. The computer program product may include one or more computer-readable tangible storage medium and program instructions stored on at least one of the one or more tangible storage medium, the program instructions executable by a processor. The computer program product may include program instructions to add a workflow stage to the workflow process in the content management system (CMS). The computer program product may also include program instructions to add a test associated with the workflow stage. The computer program product may further include program instructions to determine if a criteria threshold is met based on the test associated with the workflow stage. Additionally, the computer program product may include program instructions to publish the new workflowed item based on the criteria threshold being met.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
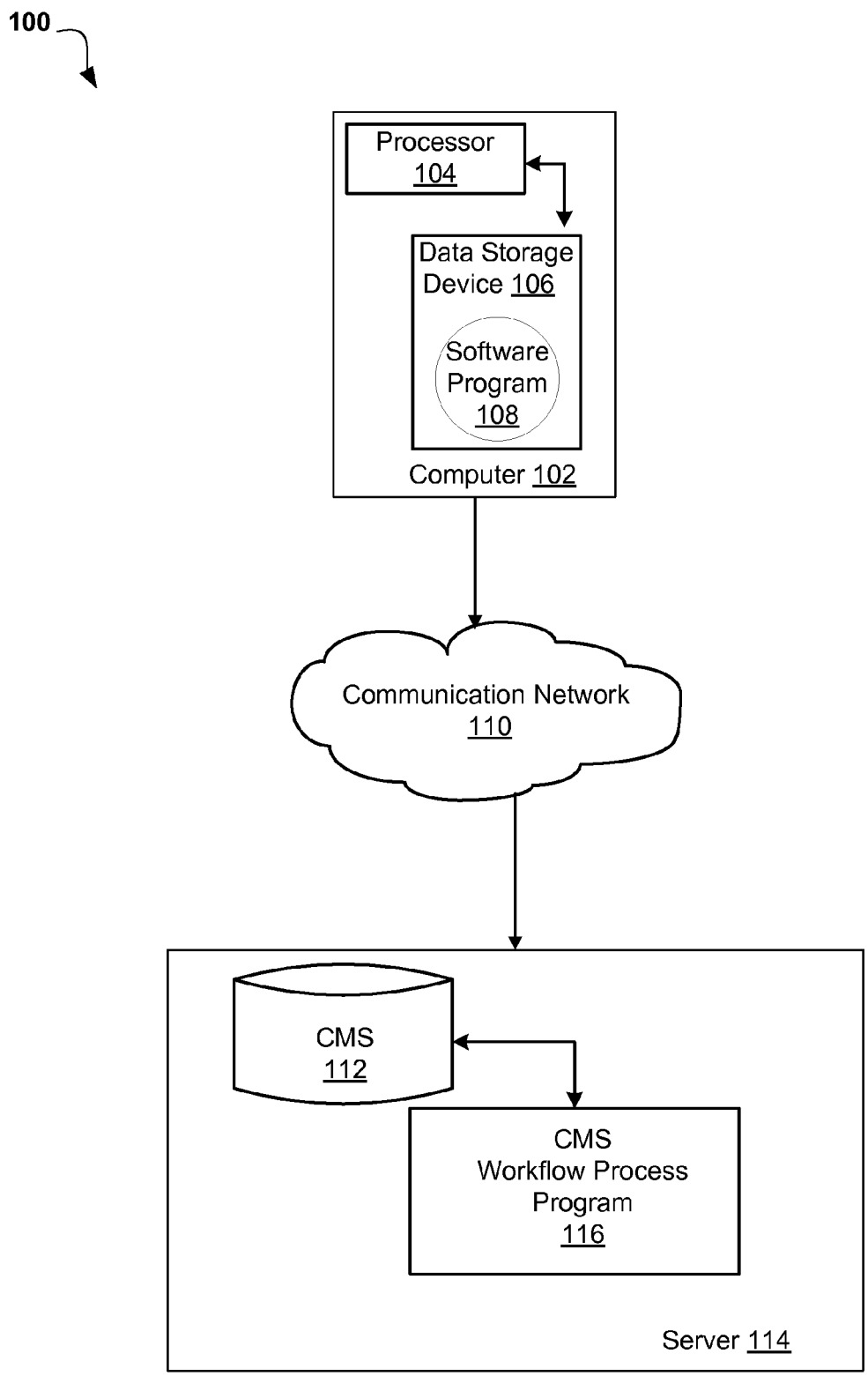
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to a workflow process. The following described exemplary embodiments provide a system, method and program product to, among other things, test a workflowed item in production using a variant test, such as an A/B test, along with performance criteria thresholds.

As previously described, content management systems (CMS) may utilize a workflow system to ensure content and changes are reviewed and approved appropriately. However, at the same time, the business may want to improve the performance of its assets, such as focusing on improving click-throughs and ultimately conversions leading to sales. As a result, marketers may run randomized experiments with two variants (i.e., A/B tests) and multi-variate tests to try to test and identify changes that may improve performance of an item. However, these tests are typically either run outside of the workflow approval governance model (with variant elements not approved or published until tests indicate they should replace current elements). Additionally, many 'duplicate' elements may be treated as published and then removed after tests are completed. As such, this incompatibility between the two models of content management may not be ideal for managing, maintaining and governing the content within the system. As such, it may be advantageous, among other things, to implement a new CMS performance-test workflow stage which may be applied to any currently "workflowed" item type.

According to at least one embodiment, a new type of stage in a CMS's workflow process where a content item, presentational change, project (i.e., a collection of content item changes), or other workflowed item is tested in production using an A/B test (or similar type of test) and particular performance criteria thresholds. If the particular criteria thresholds are met by the workflowed item, the workflowed item may be moved to the next workflow stage automatically and the workflowed item may be published.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to, among other things, test a workflowed item in production using a variant test, such as an A/B test, along with performance criteria thresholds. According to at least one embodiment, a new type of CMS workflow stage (i.e., the Performance-Test) which may be applied to any currently "workflowed" item type (i.e., the Item) may be introduced. As such, the Performance-Test stage may typically be placed in a workflow between the Draft and the Published stages, but can be used as part of any arbitrary workflow. Additionally, a "tentative approval" may place the Item in the Performance-Test stage. Therefore, when the Item is in the Performance-Test stage, the Item's draft may be treated as one half of an A/B test, with the original version of the Item being the other half. As such, some proportion of the CMS's end-users may see the draft version, and the rest of the CMS's end-users may see the currently published version.

Furthermore, the Performance-Test stage may have associated with it some configurable Criteria and Thresholds. The Criteria may include click-through and sale rates, time on page, rendering performance, return rate, or any other measurable performance criteria. The Thresholds may include a percentage improvement in a combination of the Criteria, or no degradation in performance across the Criteria, or any other function of the Criteria measurements. The Performance-Test stage may also have a time Limit. The time limit may be the time for which the A/B test should be run. Therefore, after the Limit has been met, the performance of the Item (the Criteria) may be compared between the variations in the A/B test. As such, if the Thresholds are met by the new version of the Item, then the Item may be automatically moved to the next stage in the workflow (e.g. Published). However, if the Thresholds are not met, then the item may be automatically returned to the previous stage in the workflow (e.g. Draft). In an alternate embodiment, the duration of the test may be based on the number of views of the content, or statistical significance of the performance test measurements. For example, a popular content item part of a web-page may require less time to test than a less popular part.

Referring now to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a content management system (CMS) 112, a server 114 running a CMS workflow process program 116 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with content management system (CMS) 112 running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of accessing a network.

As previously described, the client computer 102 may access the content management system (CMS) 112, running on server computer 114 via the communications network 110. For example, a user using an application program 108 (e.g., Firefox®) (Firefox and all Firefox-based trademarks and logos are trademarks or registered trademarks of Mozilla and/or its affiliates) running on a client computer 102 may connect via a communication network 110 to the content management system (CMS) 112 which may be running on server computer 114. The CMS workflow process program 116, running on server computer 114 may introduce a "Performance Test stage" and "performance criteria threshold checking" to a workflow associated with the content management system (CMS) 112. The "Performance Test stage" and "performance criteria threshold checking" may act as a means of verifying that any new content performs to some predefined target (such as click-throughs, sales, or engagement) or that edits to existing content either increase the performance, or do not decrease the performance.

A typical workflow may consist of multiple stages, such as a draft stage and a published stage. The workflow may allow new content to be created and edits to be made to existing content without the work-in-progress changes being exposed to the end-users. However, according to the present embodiment, the workflow may allow new content to be created and edits to be made to existing content with the work-in-progress changes being exposed in a controlled manner to the end-users. As such, movement between workflow stages may be controlled by managers and content authors in the CMS system 112. As previously explained, the CMS authors and managers may access the CMS system 112 through any appropriate means, for example remotely over a network 110 using a web-browser 108 from a computer 102 if the CMS 112 has a web interface, or an application specific to the CMS 112, or a plugin to a 3rd party editing tool.

Additionally, the end-users may be consumers of the content. Therefore, if the content being managed by the CMS 112 is web content or presentational information relating to web content, then the end-users may access the content remotely over a network 110 through a web browser 108 on a computer 102 or computing device 102 (mobile phone, tablet, etc.). Furthermore, web content or other content (e.g. audio or video) may also be accessed through applications 108 on computers 102 or devices 102 tailored to the content, such as ebook readers or television set-top boxes. According to one implementation of the present embodiment, the end-users may not necessarily be aware of the workflow process happening on the server. The method associated with the CMS workflow process program 116 is explained in further detail below with respect to FIG. 2.

Figure 2:
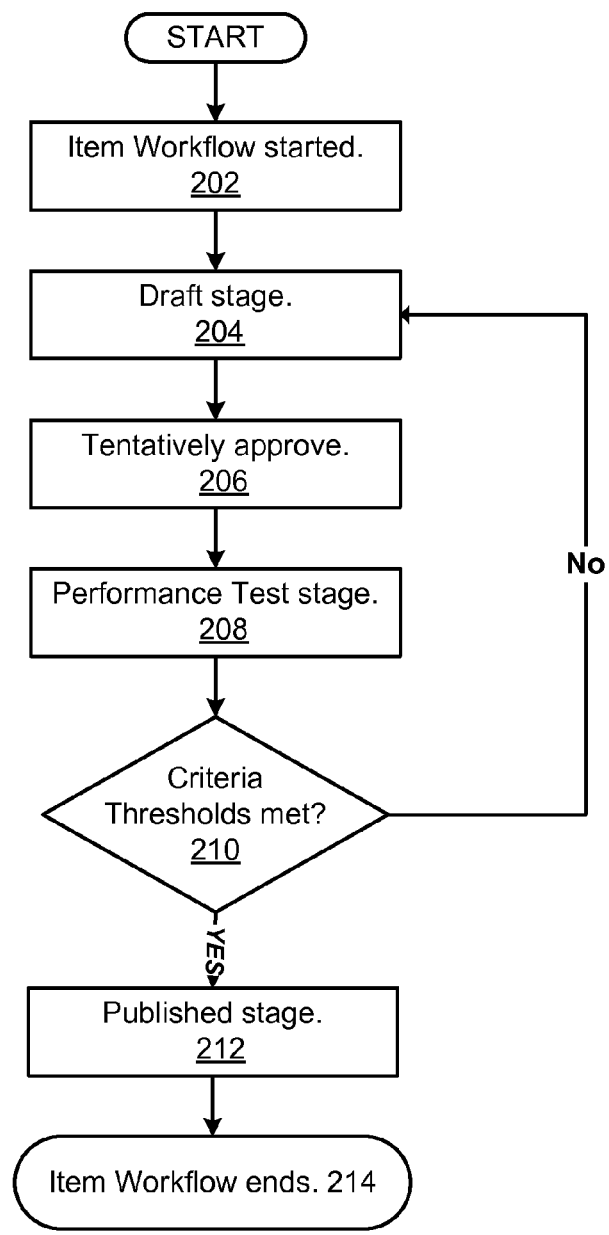
FIG. 2 is an operational flowchart illustrating the steps carried out by a program to test a workflowed item in production using a variant test along with performance criteria thresholds according to at least one embodiment.

FIG. 2, an operational flowchart 200 illustrating the steps carried out by a program to test a workflowed item in production using a variant test along with performance criteria thresholds is depicted. As previously described, the CMS workflow process program 116 (FIG. 1) may run as part of a content management system (CMS) 112 (FIG. 1), which would typically be running on a server 114 (FIG. 1). According to one implementation, the workflow process program 116 (FIG. 1) may be applied to one or more pieces of content in the CMS 112 (FIG. 1).

The content authors and managers may be responsible for defining the workflow (example "Draft; Test; and Publish" stages 202-206 depicted) and for defining which tests to run during the "Performance test stage" 208. As such, at 202, the item workflow may be started. Therefore, the CMS authors and managers may perform the "Item Workflow started" action. For example, the CMS authors and mangers may create a new content item or may initiate changes to existing content.

Then at 204, the item workflow may enter the draft stage. As such, the CMS authors and managers may perform the authoring during the "Draft stage" of the workflow. Therefore, a manager may assign particulars associated with the item workflow such as permissible author. Then at 206, the item workflow may be tentatively approved. Therefore, the CMS authors and managers may perform the "Tentatively approve" action associated with the item workflow and the "Tentative approval" may place the item workflow in the Performance-Test stage at 208.

Therefore, at 208, the "Performance Test stage" may be introduced to the workflow. As such, the "Performance Test stage" may introduce a test, such as a variant test, which may compare a new workflowed item with an old workflow item. The variant test may act as a means of verifying that the new content performs to some predefined target (such as click-throughs, sales, or engagement) or that edits to existing content either increase the performance, or do not decrease the performance. For example, when the workflowed item (i.e., Item) is in the Performance-Test stage, the Item's draft may be treated as one half of an A/B test, with the original version of the Item being the other half. As such, some proportion of the CMS's end-users may see the draft version, and the rest may see the currently published version. According to the present embodiment, the A/B or multi-variate test may be performed entirely on the server hosting the content (which may be separate from however linked to the CMS 112 (FIG. 1)) or through a combination of function running on the end-users' devices 102 (FIG. 1) and the server 114 (FIG. 1). Additionally, according to the present embodiment, current technology and methods may be utilized for the A/B and multi-variate testing.

As previously described, the Performance-Test stage may have configurable Criteria and Thresholds (i.e., criteria threshold) associated with it. The Performance-Test stage may also have a time Limit, i.e. the time for which the A/B test should be run. After the Limit, the performance of the Item (the Criteria) may be compared between the variations in the A/B test, such as a comparison of the new workflowed item with the old workflowed item (as will be explained below with respect to step 210).

Therefore, at 210 "performance criteria threshold checking" may be introduced to the workflow. Therefore, the method may determine whether the criteria thresholds are met. As previously explained, the Criteria may include click-through/sale rates, time on page, rendering performance, return rate, or any other measurable performance criteria. The Thresholds may include a percentage improvement in a combination of the Criteria, or no degradation in performance across the Criteria, or any other function of the Criteria measurements. If at 210, the criteria thresholds are not met by the new version of the item, then the item may be automatically returned to the previous stage of the workflow (e.g., the method may continue back to the draft stage at step 204). However, if at 210, the criteria thresholds are met by the new version of the Item, then the Item may be automatically be moved to the next stage in the workflow (e.g. the method may enter the published stage at 212). As such, at 212, the workflowed item may be published. Therefore all of the end-users may see the new Item version that has been published. For example, the old workflow item may be removed from a website, while the new workflowed item may become primary and as such, may be added to the website. Then at 214, the item workflow may end and the method has completed.

It may be appreciated that FIG. 2 provides only an illustration of one implementation and does not imply any limitations with regard to how different embodiments may be implemented. Many modifications to the depicted environments may be made based on design and implementation requirements. For example, in an alternate implementation of the present embodiment where a Multi-Variate test may be used by the Performance-Test stage, i.e. a test where different combinations of changes are presented to different end-users, multiple draft items from the workflowed Item may be used. Furthermore, in another implementation, where the stage following the Performance-Test stage in the workflow is not Published. As such, there may be a further manual Approval stage. Therefore, Criteria results of the different versions and Thresholds may be presented to the content author or approver for comparison in order to make a decision. Additionally, according to another implementation of the present embodiment, the test may be presented to a predefined audience, rather than to a randomly selected group of end-users. According to yet another alternate implementation, the method may create two competing variations of a new workflowed item (e.g., article or marketing campaign) which may then us an A/B/C variant test against the two new items and the existing item (if one exists). Then based on the criteria (such as registered impressions), the successful item may be promoted as the primary and the other failed item may return to the start of its workflow to be reworked or removed.

Figure 3:
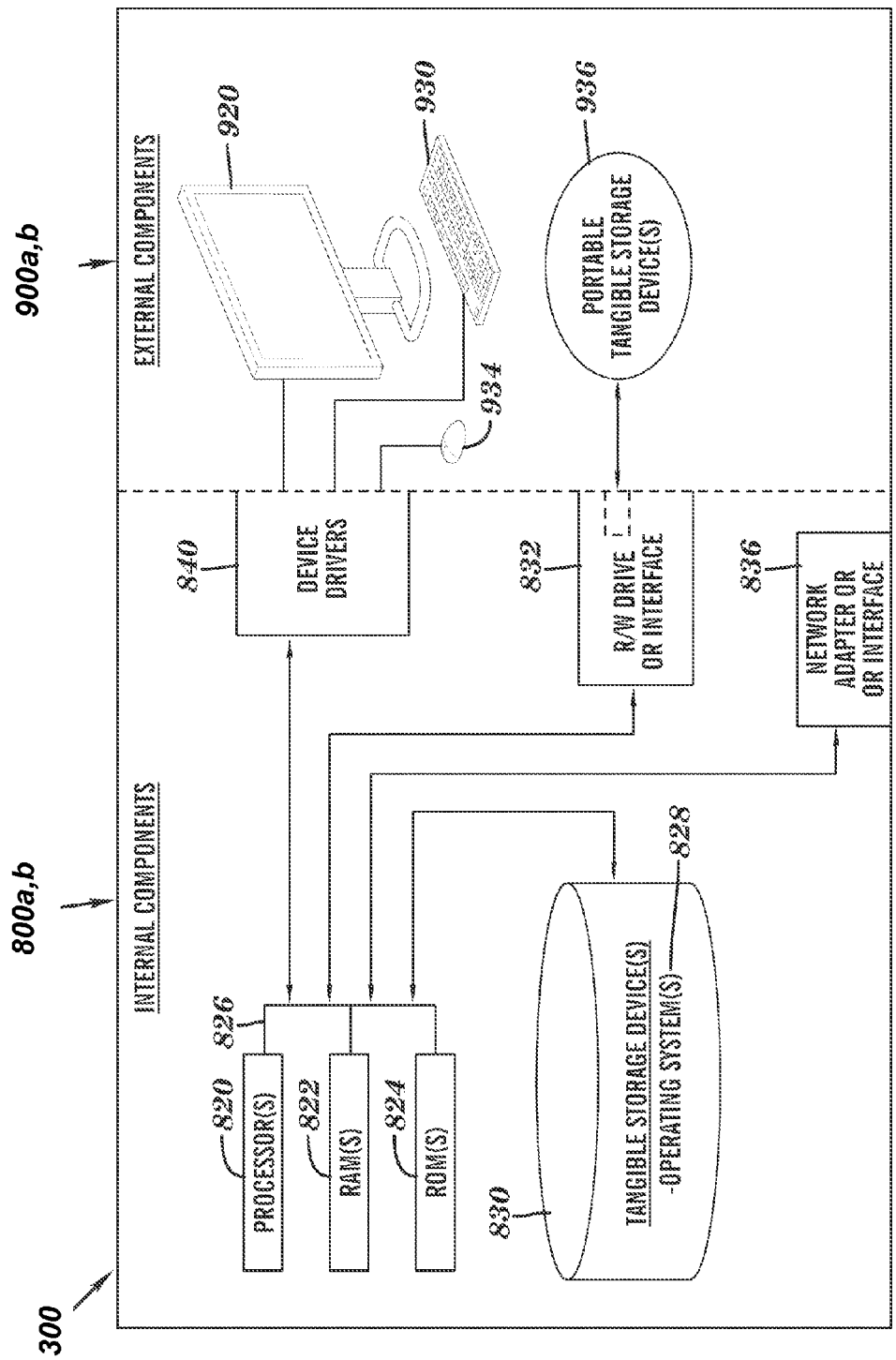
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 114 (FIG. 1) may include respective sets of internal components 800a, b and external components 900a, b illustrated in FIG. 3. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 is stored on one or more of the respective computer-readable tangible storage medium 830 for execution by one or more of the respective processors 820 via one or more of the respective RAMs 822 (which typically include cache memory). In the embodiment illustrated in FIG. 3, each of the computer-readable tangible storage medium 830 is a magnetic disk storage device of an internal hard drive. Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108 such as CMS workflow process program 116 can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 in client computer 102 and CMS workflow process program 116 can be downloaded to client computer 102 and server computer 114, respectively from an external computer via a network (for example, the Internet, a local area network or other, wide area network) and respective network adapters or interfaces 836. From the network adapters or interfaces 836, the code software program 108 in client computer 102 and CMS workflow process program 116 in server computer 114 are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing a new workflowed item associated with an online workflow process in an online content management system (CMS), the method comprising:
receiving a workflow stage, wherein the received workflow stage is a performance test stage that was entered electronically, via a graphical user interface associated with the online content management system (CMS), and wherein the graphical user interface is associated with a web browser running on a first computer that electronically accesses the online content management system (CMS) running on a second computer;
determining if the received workflow stage is tentatively approved to be added to the workflow process in the online content management system (CMS), wherein determining if the received workflow stage is tentatively approved comprises determining a tentatively approved action associated with the work flow item has occurred;
in response to determining the received workflow stage is tentatively approved to be added to the workflow process in the online content management system (CMS), adding the received workflow stage to the workflow process in the online content management system (CMS);
adding a first version of a test associated with the received workflow stage;
adding a second version of the test associated with the received workflow stage;
displaying the second version of the added test to a second proportion of a plurality of end-users associated with the online content management system (CMS);
displaying a currently published version of the received workflow stage to a third proportion of the plurality of end-users associated with the online content management system (CMS);
determining if a criteria threshold is met and a time limit is met based on the displayed added first version of the test associated with the received workflow stage, wherein the determining that the criteria threshold is met comprises a determination that there is no degradation in performance across a plurality of measurable performance criteria, wherein the measurable performance criteria includes a rendering performance, a return rate, a time on a page, a click-through rate, and a sale rate;
determining if the criteria threshold is met and the time limit is met based on the displayed added second version of the test associated with the received workflow stage;
in response to a determination that either
the criteria threshold is met and a time limit is met based on the displayed added first version of the test or
that the criteria threshold is met and the time limit is met based on the displayed added second version of the test,
electronically sending a comparison of a plurality of criteria results for the displayed added first version of the test, the displayed added second version of the test, and the displayed currently published version to a content author or an approver based on the determining if the criteria threshold is met and the time limit is met for the displayed added first version or the displayed added second version of the test associated with the received workflow stage;

in response to receiving electronic approval from the content author or the approver to publish the displayed added first version of the test, electronically publishing the displayed added first version of the test, wherein electronically publishing the displayed added first version of the test includes displaying the added first version of the test to the first proportion, second proportion, and third proportion;

in response to receiving electronic approval from the content author or the approver to publish the displayed added second version of the test, electronically publishing the displayed added second version of the test, wherein electronically publishing the displayed added first version of the test includes displaying the added second version of the test to the first proportion, second proportion, and third proportion; and in response to either a determination that the time limit is met based on the displayed added first version of the test, that the time limit is met based on the displayed added second version of the test, that the criteria threshold is not met based on the displayed added first version of the test, and that the criteria threshold is not met based on the displayed added second version of the test, or where responsive to the comparison of a plurality of criteria results for the displayed added first version of the test, the displayed added second version of the test, and the displayed currently published version have been sent to the content author or the approver, not receiving electronic approval from the content author or the approver to publish either the displayed added first version of the test of the displayed added second version of the test, electronically displaying the currently published version of the received workflow stage to the first proportion, second proportion, and third proportion.

2. The method of claim 1, wherein the test comprises a variant test.

3. The method of claim 2, wherein the variant test comprises a comparison between the new workflowed item and an old workflowed item.

4. The method of claim 1, wherein the workflow stage comprises at least one of a time limit determining a length of time a variant test should run and a duration of the variant test based on a number of views of the content, or a statistical significance of a performance test measurement.

5. The method of claim 1, wherein the publishing the new workflowed item comprises the removal of an old workflowed item from a website.

6. The method of claim 1, wherein publishing the new workflowed item comprises promoting the new wokflowed item as a primary item on a website.

\* \* \* \* \*